(12) United States Patent
Asatekin et al.

(10) Patent No.: US 11,944,941 B2
(45) Date of Patent: Apr. 2, 2024

(54) CHEMOSELECTIVE NANOPOROUS MEMBRANES

(71) Applicant: Trustees of Tufts College, Medford, MA (US)

(72) Inventors: Ayse Asatekin, Arlington, MA (US); Ilin Sadeghi, Arlington, MA (US)

(73) Assignee: Trustees of Tufts College, Medford, MA (US)

( * ) Notice: Subject to any disclaimer, the term of this patent is extended or adjusted under 35 U.S.C. 154(b) by 750 days.

(21) Appl. No.: 17/050,665

(22) PCT Filed: Apr. 26, 2019

(86) PCT No.: PCT/US2019/029318
§ 371 (c)(1),
(2) Date: Oct. 26, 2020

(87) PCT Pub. No.: WO2019/212889
PCT Pub. Date: Nov. 7, 2019

(65) Prior Publication Data
US 2021/0236999 A1 Aug. 5, 2021

Related U.S. Application Data

(60) Provisional application No. 62/762,319, filed on Apr. 30, 2018.

(51) Int. Cl.
*B01D 67/00* (2006.01)
*B01D 69/02* (2006.01)
(Continued)

(52) U.S. Cl.
CPC ......... *B01D 67/0093* (2013.01); *B01D 69/02* (2013.01); *B01D 69/12* (2013.01);
(Continued)

(58) Field of Classification Search
None
See application file for complete search history.

(56) References Cited

U.S. PATENT DOCUMENTS

| 2010/0317819 A1 | 12/2010 | De Keyzer et al. |
| 2014/0005304 A1* | 1/2014 | Suresh .................. C08K 3/346 |
| | | 523/400 |

(Continued)

FOREIGN PATENT DOCUMENTS

| EP | 2547369 B1 | 4/2017 |
| WO | WO-2010/031144 A1 | 3/2010 |
| WO | WO-2019/212889 A1 | 11/2019 |

OTHER PUBLICATIONS

International Search Report and Written Opinion for International Application No. PCT/US19/29318 dated Jul. 15, 2019.

(Continued)

*Primary Examiner* — Richard C Gurtowski
(74) *Attorney, Agent, or Firm* — Foley Hoag LLP; Dana M. Gordon; David S. Surry (57) ABSTRACT

Disclosed is a nanoporous membrane including a porous support layer and a selective layer. The selective layer, being deposited on a surface of the porous support layer, has an effective pore size smaller than that of the porous support layer and contains an array of polymeric nanoparticles that have on their surfaces a plurality of —C(=O)XR groups. Also disclosed are methods of fabricating a nanoporous membrane described above and using the nanoporous membrane for separating a mixture that contains two solutes.

18 Claims, 4 Drawing Sheets

(51) Int. Cl.
*B01D 69/12* (2006.01)
*B01D 71/32* (2006.01)
*B01D 71/40* (2006.01)
*B01D 71/82* (2006.01)

(52) U.S. Cl.
CPC ............ *B01D 71/32* (2013.01); *B01D 71/40* (2013.01); *B01D 71/82* (2013.01); *B01D 2323/36* (2013.01); *B01D 2323/38* (2013.01); *B01D 2325/02* (2013.01); *B01D 2325/04* (2013.01)

(56) References Cited

U.S. PATENT DOCUMENTS

| | | |
|---|---|---|
| 2014/0249031 A1* | 9/2014 | Mulqueen .............. A01N 43/22 504/359 |
| 2015/0273389 A1 | 10/2015 | Liu et al. |
| 2015/0337068 A1 | 11/2015 | Berggren et al. |
| 2017/0173535 A1 | 6/2017 | Jiang et al. |

OTHER PUBLICATIONS

Sadeghi et al., "Selective Transport through Membranes with Charged Nanochannels Formed by Scalable Self-Assembly of Random Copolymer Micelles," ACS Nano 12:95-108 (2017).

Thompson et al., "Bespoke Diblock Copolymer Nanoparticles Enable the Production of Relatively Stable Oil-in-Water Pickering Nanoemulsions," Languir 33:12616-12623 (2017).

Xu et al., "Perfluorocyclobutyl Aryl Ether-Based ABC Amphiphilic Triblock Copolymer," Sci Rep 6(39504):1-16 (2016).

* cited by examiner

CHEMOSELECTIVE NANOPOROUS MEMBRANES

RELATED APPLICATIONS

This application is a National Stage of International Patent Applicant No. PCT/US2019/029318, filed Apr. 26, 2019; which claims the benefit of priority to U.S. Provisional Application No. 62/762,319, filed Apr. 30, 2018.

GOVERNMENT SUPPORT

This invention was made with government support under grant numbers 1553661 and 1703549 awarded by the National Science Foundation. The government has certain rights in the invention.

BACKGROUND

Chemical separations account for approximately ten percent of the world's energy consumption. Separation of small molecules, e.g., organic compounds having molecular weight of less than 800 daltons, is particularly energy-intensive, often carried out by distillation, extraction, or chromatography.

On the other hand, membrane filtration is energy efficient, providing a simple and practical approach for chemical separation and purification. Nanoporous membranes have received much attention for their applicability in varied areas including, among others, wastewater treatment, pharmaceuticals, and food industry. These areas typically require selective separation and purification.

However, the applicability of selective membranes is often limited to size-based or charge-based separation of organic molecules. Indeed, conventional nanoporous membranes, relying on their pore sizes for separation, lack sufficient specificity and selectivity when separating two organic molecules having a similar size or electrical charge but displaying different structural features.

There is a need to develop a new filtration membrane that effectively separates two organic molecules of similar size or electrical charge.

SUMMARY

An aspect of the present invention is a nanoporous membrane that contains a porous support layer and a selective layer. Unexpectedly, the nanoporous membrane can separate two organic molecules of similar size or electrical charge with high specificity and selectivity.

The selective layer, deposited on a surface of the porous support layer, has an effective pore size smaller than that of the porous support layer. More specifically, the selective layer has an effective pore size of less than 20 nm and the porous support layer has an effective pore size of 2 nm to 10 µm.

Notably, the selective layer contains an array of polymeric nanoparticles and nanopores therebetween. The polymeric nanoparticles, formed of amphiphilic copolymers, each have on their surfaces a plurality of —C(=O)XR groups, in which X is O, S, or NR', R' being H, alkyl, aryl alkyl, heteroaryl alkyl, aryl, or heteroaryl, and R is aryl alkyl, heteroaryl alkyl, aryl, or heteroaryl, each of alkyl, aryl alkyl, heteroaryl alkyl, aryl, and heteroaryl being optionally mono-, di-, or tri-substituted with halo, hydroxyl, nitro, cyano, amino, $C_{1-6}$ alkyl, $C_{1-6}$ haloalkyl, $C_{1-6}$ alkoxyl, $C_{3-10}$ cycloalkyl, $C_{1-10}$ heterocycloalkyl, aryl, or heteroaryl.

The amphiphilic copolymers each typically contain a hydrophilic repeat unit and a hydrophobic repeat unit, the two repeat units being in a roughly random order. The hydrophilic repeat unit can be formed from a first vinyl compound containing one or more carboxylic acid groups. On the other hand, the hydrophobic repeat unit can be formed from a second vinyl compound containing one or more fluorine atoms. An exemplary hydrophilic repeat unit is formed from methacrylic acid (MAA) and an exemplary hydrophobic repeat unit is formed from trifluoroethyl methacrylate (TFEMA).

Another aspect of this invention is a method of fabricating a nanoporous membrane described above. The method includes the steps of (i) providing a solution of polymeric micelles by dissolving amphiphilic copolymers in an organic solvent; (ii) obtaining a two-layer film by coating onto a porous support layer the solution of polymeric micelles to form a selective layer that contains an array of polymeric nanoparticles and nanopores therebetween, the polymeric nanoparticles each having on their surfaces a plurality of —C(=O)OH groups; and (iii) transforming the plurality of —C(=O)OH groups in part or in whole to a plurality of —C(=O)XR groups.

The organic solvent can be an alcohol, e.g., methanol. An exemplary amphiphilic copolymer is P(TFEMA-r-MAA).

A further aspect of this invention is a method of separating a mixture that contains two solutes. The method includes the following steps: providing a nanoporous membrane, directing a mixture through the nanoporous membrane that allows one of the two solutes permeates through, and collecting the solute that permeates through the nanoporous membrane.

This method can effectively separate two solutes that are organic molecules of similar size or electrical charge. In an exemplary method, one of the two organic molecules contains an aromatic group and the other does not.

The details of the invention are set forth in the description below. Other features, objects, and advantages of the invention will be apparent from the following drawings and detailed description of several embodiments, and also from the appending claims.

BRIEF DESCRIPTION OF THE DRAWINGS

FIGS. 6(A)-6(C) indicate the studies with a single solute and FIGS. 6(E)-6(F) indicate competitive diffusion studies. FIG. 6(D) indicates permeation flux and selectivity in a single-solute study and FIG. 6(H) indicates flux in a competitive diffusion study. All studies demonstrate aromaticity-driven selectivity. The selectivity pattern is switched in competitive studies.

DETAILED DESCRIPTION

Disclosed first in detail herein is a nanoporous membrane that effectively separates two organic molecules of similar size or electrical charge.

Most attempts to construct membranes that perform chemical structure-based separations derive their inspiration from biological pores like porins and ion channels, which exhibit exceptional selectivity combined with efficient and fast permeation. These features arise from confining flow into constricted pores lined with functional groups. The small pore size, on the order of the target solute (about 1 nm for small molecules), forces all solutes to closely interact with the pore walls. Solutes that favorably but reversibly interact with the nanochannels are preferentially partitioned into the nanopores, and prevent the entry of other solutes. This implies that synthetic membranes that feature very small pores (less than 3 nm for small molecule separations) lined with properly selected functional groups that selectively but reversibly interact with specific solutes can potentially separate organic molecules of similar size but different chemical features.

Traditional approaches to prepare such membranes involve modifying membranes with cylindrical through pores by narrowing down and functionalizing their pores. These approaches, including electroless gold deposition, atomic layer deposition, and initiated chemical vapor deposition, have shown that separations based on size, charge, hydrophobicity, and chirality can be achieved. However, broader use of these methods is limited due to complexity of the fabrication process and the very low porosity of the resultant membranes.

In contrast, generating functional nanopores by self-assembly can offer simpler, more scalable manufacture along with higher pore density and permeability. Block copolymers can form membranes with ordered structures and can be functionalized, but due to their inherent size scale of microphase separation, it is extremely difficult to create pores with sizes less than 5 nm for enhancing the separation of small molecules. Smaller nanopores can be formed by the self-assembly of other organic materials such as small molecule amphiphiles with crown moieties, macrocyclic peptides, nanoparticle/dendrimer mixtures, cross-linkable lyotropic liquid crystals, and carbon nanotubes. See, e.g., Chapman et al., Chemical Society Reviews, 2012, 41(18), 6023-6041; Park et al., Adv. Mater., 2012, 24, 5862-5866; Gin et al., Advanced Functional Materials, 2006, 16(7), 865-878; Hinds et al., 2004, 303(5654), 62-65; and Ghadiri et al., Nature, 1993, 366(6453), 324-327. However, these approaches require custom synthesis of reagents (e.g., polymerizable surfactants and peptide rings). Many result in cylindrical nanopores that need to be aligned vertically to the surface, challenging to achieve in large scale manufacturing. Furthermore, many of these systems show limited chemical functionalizability due to limited stability and/or poor accessibility of functional groups during post-modification steps. This means most of these systems are limited in the types of separations they can perform. Indeed, only size- and charge-based selectivity has been demonstrated in membranes formed by self-assembly. Thus, it is highly desired to develop functional membranes that offer superior robustness such as polymers and tunable surface chemistry for controlled selectivity.

Notably, an important application of membrane filtration is the separation of solutes based on aromaticity, or based on electron density in an aromatic ring, which lead to $\pi$-$\pi$ interactions with other aromatic groups. These interactions are ubiquitous in biological processes such as protein-ligand complexation, protein folding and stacking in duplex DNA and in chemical processes that govern self-assembly, catalysis, and transport. However, the possible role of $\pi$-$\pi$ interactions in chemical selectivity of small molecules has not been explored in the context of membrane-based separations. Developing membranes that separate compounds based on the presence and electron density of aromatic rings is of great interest for a wide range of applications from separation of aromatic amino acids for nutritional applications to cosmetics, pharmaceuticals, and drug delivery. It also has the potential to influence one of the highest volume separations in petrochemical industry, dewaxing of aromatic compounds.

Unexpectedly, the nanoporous membranes of this invention can separate two organic molecules having a similar size or charge based on their structural features, e.g., the presence of an aromatic group.

As set forth above, the nanoporous membrane contains a porous support layer and a selective layer deposited thereon.

The selective layer has an effective pore size of less than 20 nm (e.g., less than 10 nm, less than 5 nm, and 1-3 nm) and the porous support layer has an effective pore size of 2 nm to 10 μm (e.g., 5 nm to 1 μm, 5-50 nm, and 5-30 nm). Note that the selective layer has an effective pore size smaller than that of the porous support layer.

In general, the selective layer has a thickness of 50 nm to 2 μm, preferably 100 nm to 1 μm, and more preferably 200 nm to 600 nm.

In one aspect, disclosed herein are nanoporous membranes, comprising:
a. a porous support layer having a first effective pore size of 2 nm to 10 μm; and
b. a selective layer having a second effective pore size of less than 20 nm, wherein the selective layer, deposited on a surface of the porous support layer, contains an array of polymeric nanoparticles and nanopores therebetween; the second effective pore size is smaller than the first effective pore size; and the polymeric nanoparticles, formed of amphiphilic copolymers, each have on their surfaces a plurality of —C(=O)XR groups, in which X is O, S, or NR', R' being H, alkyl, aryl alkyl, heteroaryl alkyl, aryl, or heteroaryl, and R is aryl alkyl, heteroaryl alkyl, aryl, or heteroaryl, each of alkyl, aryl alkyl, heteroaryl alkyl, aryl, and heteroaryl being optionally mono-, di-, or tri-substituted with halo, hydroxyl, nitro, cyano, amino, $C_{1-6}$ alkyl, $C_{1-6}$ haloalkyl, $C_{1-6}$ alkoxyl, $C_{3-10}$ cycloalkyl, $C_{3-10}$ heterocycloalkyl, $C_{5-10}$ aryl, or $C_{5-10}$ heteroaryl.

In certain embodiments, the amphiphilic copolymers each contain a hydrophilic repeat unit and a hydrophobic repeat unit, the two repeat units being in a roughly random order.

In certain embodiments, the polymeric nanoparticles each contain a hydrophilic repeat unit, a hydrophobic repeat unit, and a conjugated repeat unit having a —C(=O)XR group, the three repeat units being in a roughly random order.

In certain embodiments, the hydrophilic repeat unit is formed from a first vinyl compound containing one or more carboxylic acid groups and the hydrophobic repeat unit is formed from a second vinyl compound containing one or more fluorine atoms. In certain preferred embodiments, the first vinyl compound is selected from the group consisting of acrylic acid, methacrylic acid, a methacrylate, an acrylate, an acrylamide, and styrene; and the second vinyl compound is selected from the group consisting of a methacrylate, an acrylate, an acrylamide, and styrene. In certain preferred embodiments, the hydrophilic repeat unit is formed from methacrylic acid (MAA) and the hydrophobic repeat unit is formed from trifluoroethyl methacrylate (TFEMA).

In certain embodiments, the hydrophilic repeat unit is formed from a first vinyl compound containing one or more carboxylic acid groups and the hydrophobic repeat unit is formed from a second vinyl compound containing one or more fluorine atoms.

In certain embodiments, the hydrophilic repeat unit is formed from MAA and the hydrophobic repeat unit is formed from TFEMA.

In certain embodiments, the polymeric nanoparticles each have on their surfaces a plurality of —C(=O)XR groups, in which X is O or NR'. In certain preferred embodiments, the polymeric nanoparticles each have on their surfaces a plurality of —C(=O)XR groups, in which X is O and R is aryl alkyl or aryl. In certain preferred embodiments, the polymeric nanoparticles each have on their surfaces a plurality of —C(=O)XR groups, in which X is NR', R' being H, and R is aryl alkyl or aryl.

In certain embodiments, the first effective pore size is 5-50 nm and the second effective pore size is less than 5 nm. In some preferred embodiments, the first effective pore size is 5-30 nm and the second effective pore size is 1-3 nm.

In certain embodiments, the selective layer has a thickness of 50 nm to 2 μm. In some preferred embodiments, the selective layer has a thickness of 100 nm to 1 μm.

In certain embodiments, the amphiphilic copolymers each contain a hydrophilic repeat unit and a hydrophobic repeat unit, the two repeat units being in a roughly random order; and the polymeric nanoparticles each have on their surfaces a plurality of —C(=O)XR groups, in which X is O or NR'.

In certain embodiments, the hydrophilic repeat unit is formed from MAA and the hydrophobic repeat unit is formed from TFEMA; and the polymeric nanoparticles each have on their surfaces a plurality of —C(=O)XR groups, in which X is NR', R' being H, and R is aryl alkyl or aryl.

In another aspect, provided herein are methods of fabricating a nanoporous membrane of claim 1, the methods comprising:
  a. providing a solution of polymeric micelles by dissolving amphiphilic copolymers in an organic solvent;
  b. obtaining a two-layer film by coating onto a porous support layer the solution of polymeric micelles to form a selective layer that contains an array of polymeric nanoparticles and nanopores therebetween, the polymeric nanoparticles each having on their surfaces a plurality of —C(=O)OH groups; and
  c. transforming the plurality of —C(=O)OH groups in part or in whole to a plurality of —C(=O)XR groups.

In certain embodiments, each of the amphiphilic copolymers is P(TFEMA-r-MAA).

In another aspect, provided herein are methods of separating a mixture that contains two solutes, the methods comprising:
  a. providing a nanoporous membrane of claim 1;
  b. directing the mixture through the nanoporous membrane that allows one of the two solutes permeates through; and
  c. collecting the solute that permeates through the nanoporous membrane.

In certain embodiments, the two solutes are two organic molecules of similar size or electrical charge. In some embodiments, one of the two organic molecules contains an aromatic group and the other does not.

To reiterate, the selective layer contains an array of polymeric nanoparticles and nanopores therebetween. Further, the polymeric nanoparticles, formed of amphiphilic copolymers, each have on their surfaces a plurality of —C(=O)XR groups, in which X is O, S, or NR', R' being H, alkyl, aryl alkyl, heteroaryl alkyl, aryl, or heteroaryl, and R is aryl alkyl, heteroaryl alkyl, aryl, or heteroaryl, each of alkyl, aryl alkyl, heteroaryl alkyl, aryl, and heteroaryl being optionally mono-, di-, or tri-substituted with halo, hydroxyl, nitro, cyano, amino, $C_{1-6}$ alkyl, $C_{1-6}$ haloalkyl, $C_{1-6}$ alkoxyl, $C_{3-10}$ cycloalkyl, $C_{1-10}$ heterocycloalkyl, aryl, or heteroaryl.

The term "alkyl" herein refers to a straight or branched hydrocarbon group, containing 1-20 (e.g., 1-10 and 1-6) carbon atoms. Examples include methyl, ethyl, n-propyl, i-propyl, n-butyl, i-butyl, and t-butyl. The term "haloalkyl" refers to alkyl substituted with one or more halogen (chloro, fluoro, bromo, or idodo) atoms. Examples include trifluoromethyl, trifluoroethyl, bromomethyl, and 4,4,4-trifluorobutyl. The term "alkoxy" refers to an —O-alkyl group. Examples include methoxy, ethoxy, propoxy, and iso-propoxy.

The term "cycloalkyl" refers to a saturated and partially unsaturated monocyclic, bicyclic, tricyclic, or tetracyclic hydrocarbon group having 3 to 10 carbons. Examples include cyclopropyl, cyclobutyl, cyclopentyl, cyclopentenyl, cyclohexyl, cyclohexenyl, cycloheptyl, and cyclooctyl. The term "heterocycloalkyl" refers to a nonaromatic 5-8 membered monocyclic, 8-12 membered bicyclic, or 11-14 membered tricyclic ring system having one or more heteroatoms (e.g., O, N, P, and S). Examples include piperazinyl, imidazolidinyl, azepanyl, pyrrolidinyl, dihydrothiadiazolyl, dioxanyl, morpholinyl, tetrahydropuranyl, and tetrahydrofuranyl.

The term "halo" refers to a fluoro, chloro, bromo, or iodo radical. The term "amino" refers to a radical derived from amine, which is unsubstituted or mono-/di-substituted with alkyl, aryl, cycloalkyl, heterocycloalkyl, or heteroaryl.

The term "aralkyl" refers to alkyl substituted with an aryl group. Examples include benzyl and naphthylmethyl. The term "heteroaralkyl" refers to an alkyl group substituted with a heteroaryl group. Examples include pyridylmethyl and furylmethyl.

The term "aryl" refers to a 6-carbon monocyclic, 10-carbon bicyclic, 14-carbon tricyclic aromatic ring system. Examples of aryl groups include phenyl, naphthyl, and anthracenyl. The term "heteroaryl" refers to an aromatic 5-8 membered monocyclic, 8-12 membered bicyclic, or 11-14 membered tricyclic ring system having one or more heteroatoms (e.g., O, N, P, and S). Examples include triazolyl, oxazolyl, thiadiazolyl, tetrazolyl, pyrazolyl, pyridyl, furyl, imidazolyl, benzimidazolyl, pyrimidinyl, thienyl, quinolinyl, indolyl, thiazolyl, and benzothiazolyl.

Alkyl, haloalkyl, alkoxy, cycloalkyl, heterocycloalkyl, aralkyl, heteroaralkyl, aryl, and heteroaryl mentioned herein include both substituted and unsubstituted moieties. Possible substituents on alkoxy, cycloalkyl, heterocycloalkyl, aralkyl, heteroaralkyl, aryl, and heteroaryl include, but are not limited to, $C_1$-$C_{10}$ alkyl, $C_3$-$C_{20}$ cycloalkyl, $C_1$-$C_{20}$ heterocycloalkyl, $C_1$-$C_{10}$ alkoxy, aryl, heteroaryl, amino, hydroxyl, halo, thio, acylamino, aminoacyl, aminothioacyl, amido, amidino, guanidine, ureido, thioureido, cyano, nitro, nitroso, azido, acyl, thioacyl, acyloxy, carboxyl, and carboxylic ester. On the other hand, possible substituents on alkyl or haloalkyl include all of the above-recited substituents except $C_1$-$C_{10}$ alkyl. Cycloalkyl, heterocycloalkyl, aryl, and heteroaryl can also be fused with each other.

In a typical nanoporous membrane, the amphiphilic copolymers each contain a hydrophilic repeat unit and a hydrophobic repeat unit, the two repeat units being in a roughly random order. Generally, the hydrophilic repeat unit is formed from a first vinyl compound containing one or more carboxylic acid groups (i.e., —C(=O)OH) and the hydrophobic repeat unit is formed from a second vinyl compound containing one or more fluorine atoms. The term "roughly random order" herein refers to a random copolymer or a roughly random copolymer in which monomer residues are located randomly in the polymer molecule. See, e.g., Painter et al., *Fundamentals of Polymer Science*, CRC Press, 1997, 14.

The polymeric nanoparticles formed from the amphiphilic copolymers have on their surfaces a plurality of —C(=O)OH groups, which can be converted into a plurality of —C(=O)XR groups via standard chemical transformations, e.g., amide formation and ester formation. Note that these —C(=O)OH groups can partially or wholly be converted into —C(=O)XR groups. When the —C(=O)OH groups are partially converted into —C(=O)XR groups, the selective layer of a nanoporous membrane thus formed includes an array of polymeric nanoparticles each containing a hydrophilic repeat unit having a —C(=O)OH group, a hydrophobic repeat unit having one or more fluorine atoms, and a conjugated repeat unit having a —C(=O)XR group, the three repeat units being in a roughly random order.

In a hydrophilic repeat unit, the first vinyl compound can be one of acrylic acid, methacrylic acid, a methacrylate, an acrylate, an acrylamide, and styrene. For example, the hydrophilic repeat unit containing one or more carboxylic acid groups can be formed from acrylic acid, methacrylic acid (MAA), a methacrylate containing a —C(=O)OH group, an acrylate containing a —C(=O)OH group, an acrylamide containing a —C(=O)OH group, or styrene containing a —C(=O)OH group.

In a hydrophobic repeat unit, the second vinyl compound can be one of a methacrylate, an acrylate, an acrylamide, and styrene. For example, the hydrophobic repeat unit containing one or more fluorine atoms can be formed from trifluoroethyl methacrylate (TFEMA), a fluorinated acrylate, a fluorinated acrylamide, or a fluorinated styrene.

An exemplary nanoporous membrane includes a selective layer that contains a hydrophilic repeat unit formed from methacrylic acid (MAA) and a hydrophobic repeat unit formed from trifluoroethyl methacrylate (TFEMA).

Turning to the plurality of —C(=O)XR groups, the polymeric nanoparticles typically have on their surfaces these groups converted from —C(=O)OH groups via either amide formation, i.e., X being NR', or ester formation, i.e., X being O. In one embodiment, the polymeric nanoparticles each have on their surfaces a plurality of —C(=O)XR groups, in which X is O and R is aryl alkyl or aryl. In another embodiment, the polymeric nanoparticles each have on their surfaces a plurality of —C(=O)XR groups, in which X is NR', R' being H, and R is aryl alkyl or aryl.

Still within the scope of this invention is a method of fabricating a nanoporous membrane described above.

As pointed out above, the preparation method includes the following steps: providing a solution of polymeric micelles by dissolving amphiphilic copolymers in an organic solvent; obtaining a two-layer film by coating onto a porous support layer the solution of polymeric micelles to form a selective layer that contains an array of polymeric nanoparticles and nanopores therebetween, the polymeric nanoparticles each having on their surfaces a plurality of —C(=O)OH groups; and transforming the plurality of —C(=O)OH groups in part or in whole to a plurality of —C(=O)XR groups.

The —C(=O)OH groups, which are exposed on the surfaces of the polymeric nanoparticles, can be converted to various functional groups via standard chemical transformations such as amide formation and ester formation. For example, they can react with suitable amines through conjugation under the conditions of (1-ethyl-3-(3-dimethylaminopropyl)-carbodiimide) or EDC and N-hydroxysuccinimide (NHS), known as EDC/NHS conjugation. With this approach, a phenol group can be generated on the nanopore surfaces of the polymeric nanoparticles by EDC/NHS coupling of tyrosinol (TYR) with the —C(=O)OH groups on the nanopores.

The method for preparing the above-described nanoporous membrane can be translatable to roll-to-roll manufacturing by functionalizing the walls of the nanopores (1-3 nm in size) formed by the self-assembly of a random copolymer during coating. Indeed, these membranes include selective layers formed of a packed array of micelles containing carboxylic acid functional groups on their surfaces. The interstices between the micelles serve as permeation pathways, lined with carboxylate functional groups that can be used for performing charge-based separations.

Further covered by this invention is a method of separating a mixture that contains two solutes. The method includes steps (i) providing a nanoporous membrane, (ii) directing a mixture through the nanoporous membrane that allows one of the two solutes permeates through, and (iii) collecting the solute that permeates through the nanoporous membrane.

The nanoporous membranes of this invention show high water permeability. More importantly, they unexpectedly exhibit high selectivity between two solutes of similar size and charge but having different chemical structures.

In an exemplary separation method, a nanoporous membrane described above effectively separates two organic molecules based on their aromaticity difference, namely, one of the two organic molecules contains an aromatic group and the other does not. More specifically, as described in EXAMPLE 4 below, the nanoporous membrane containing phenol groups can separate estrone sulfate (ESTR) and pregnenolone sulfate (PREG) based on their chemical structures. ESTR containing an aromatic group selectively passes through the membrane while the passage of PREG is inhibited when both molecules are fed to the membrane.

Without further elaboration, it is believed that one skilled in the art can, based on the above description, utilize the present invention to its fullest extent. The following specific examples are, therefore, to be construed as merely illustrative, and not limitative of the remainder of the disclosure in any way whatsoever. The publications cited herein are incorporated by reference in their entirety.

EXAMPLES

Provided below are methods used for preparing, characterizing, and analyzing the nanoporous membranes of this invention.

Example 1: Synthesis of Random Copolymer
Poly(trifluoroethyl methacrylate-r-methacrylic Acid)
(PTFEMA-r-MAA)

A random copolymer from two monomers, hydrophobic TFEMA and hydrophilic MAA, was synthesized as follows.

The random copolymer was used in the preparation of certain membranes of this invention.

Figure 1:
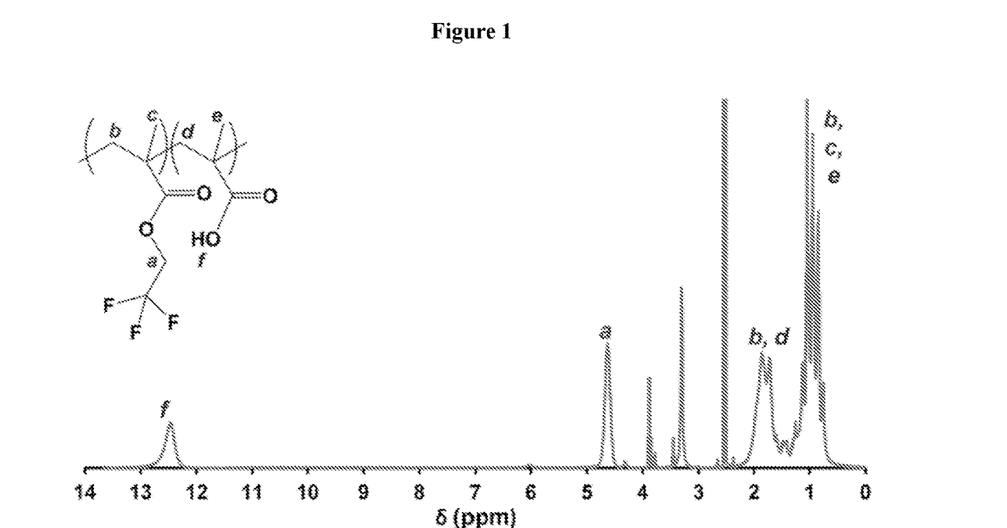
FIG. 1 is a schematic depiction of NMR spectrum of the structure of copolymer PTFEMA-r-MAA in deuterated dimethyl sulfoxide, showing the characteristic peaks and corresponding protons. Peaks a and d are used to calculate copolymer composition.

More specifically, TFEMA (scientific polymer) was passed through a column of basic Alumina (Aldrich) to purify and remove the inhibitor. A neutral alumina column was used for the removal of inhibitor from MAA (Adrich). 5 g of each monomer (TFEMA and MAA) and 30 mL of DMSO were added to a round bottom flask with a magnetic stirrer. In order to initiate the reaction, azobisisobutyronitrile (AIBN, 0.005 g, Aldrich) also added to the flask. The flask was sealed with a rubber septum, and Nitrogen was bubbled through the reaction mixture for 30 minutes to purge any dissolved oxygen. The flask was then kept at 55° C. while stirring for about 4 hours. After the reaction, 0.5 g of 4-methoxyphenol (MEHQ) was added to terminate the reaction. The reaction mixture was observed to be viscous, and additional amount of solvent (DMSO) was added to dilute the solution. The copolymer was then precipitated in a solution of ethanol and hexane (1 to 3 ratio respectively) and washed 3 times using fresh solvents. The final polymer obtained by air-drying the polymer for an overnight followed by drying in vacuum oven at 50° C. overnight. The composition of the copolymer was calculated from the $^1$H-NMR spectrum (FIG. 1). The copolymer was determined to contain about 50 wt % MAA.

Example 2: Formation of a Membrane Coated with PTFEMA-r-MAA

In this example, a membrane was prepared by coating a porous support layer with the copolymer obtained in EXAMPLE 1 as follows.

Different copolymer concentrations (5, 10, and 15 wt %) were dissolved in methanol at about 50° C. with stirring overnight. The extreme incompatibility between the highly hydrophilic MAA units and very hydrophobic, fluorinated TFEMA segments leads to the formation of micelles in methanol.

Figure 2:
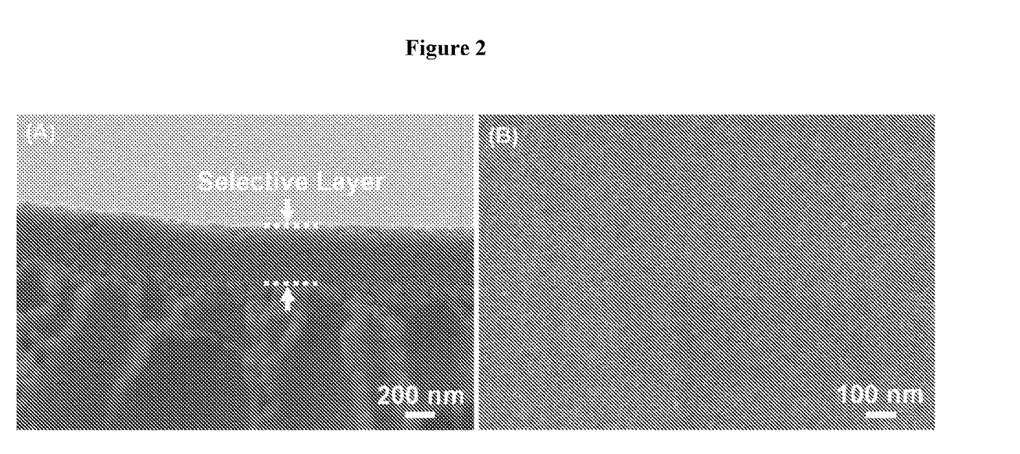
FIG. 2 is a schematic depiction of cross-section (A) and surface morphology (B) of a membrane prepared with 5 wt % of copolymer in methanol (dipped in de-ionized water after 20 s of solvent evaporation).

Micellar solution then passed through a 1 micrometer syringe filter (Whatman) and degassed in vacuum oven at 50° C. at least 1 hour. The membrane was then prepared by coating a thin layer of micellar solution on a commercial porous ultrafiltration membrane (i.e., a porous support layer) using a casting knife with a gap of 20 micron. Commercial polyacrylonitrile membranes (PAN 400, 200 kDa) were purchased from Nanostone Inc., and were used as support membranes. After coating, the solvent was allowed to evaporate (for example: 20 s) to direct the self-assembly of micelles, the film was immersed in DI water to freeze the structure. As a result, the self-assembled random copolymer micelles were kinetically trapped in a nicely packed array of spheres. The interconnected interstices between the micelles act as nanochannels that are all lined with carboxylic acid functional groups. The membrane was cut freeze-fractured in liquid nitrogen and the cross section was imaged using a field-emission scanning electron microscopy or FESEM (FIG. 2). The coating thickness was measured to be about 400 nm.

Example 3: Membrane Functionalization

In this example, a study was performed to transform the membrane functional groups for separations based on certain chemical criteria (e.g., aromaticity, hydrophobicity, and chirality) as follows.

The membrane pores were functionalized with a primary amine molecule containing an aromatic group, i.e., tyrosinol (TYR; containing a phenol group). Carbodiimide was used in EDC/NHS conjugation to covalently attach tyrosinol to the pore walls. As a control, another membrane with a non-aromatic molecule was functionalized with a similar molecule, 2-amino-3-cyclohexyl-1-propanol (ACP).

Membranes were first immersed in 50 mM MES buffer at pH 6 for 1 h to deprotonate carboxylic acid groups. Next, to convert the carboxylate ions on the membrane to reactive intermediates, the membranes were immersed in EDC/NHS solution with different concentrations and molar ratios in MES buffer (Sigma Aldrich) at room temperature 25° C. on a nutating mixer and at varying times. Unreacted EDC and NHS were removed by rinsing the membrane with 50 mM MES buffer (pH 6) for three times.

For amine conjugation, the membrane was immersed in solution containing different concentration of desired amino compound in 5×SSC (saline-sodium citrate, Sigma Aldrich) buffer (adjusted pH to 8 with 0.1 M NaOH) on a nutating mixer at varying time. Unreacted amines were removed by rinsing the membrane with 2×SSC buffer twice and final rinsing with DI water. Samples were taken out at different time interval during each step for infrared measurements.

Figure 3:
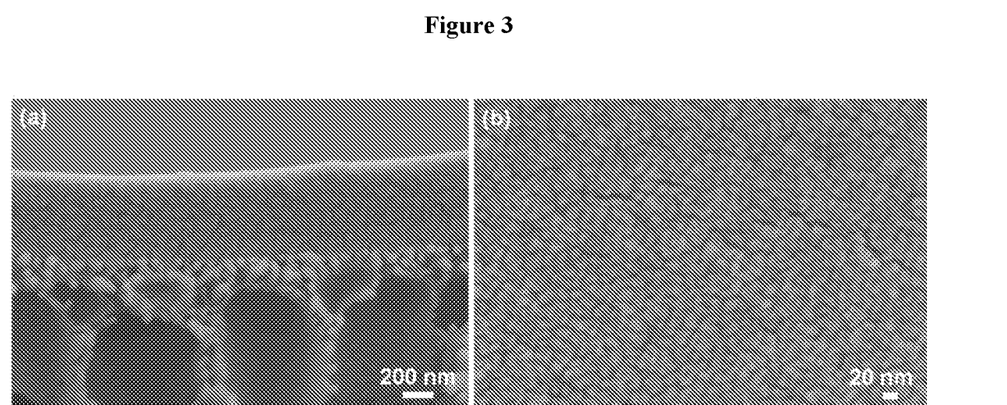
FIG. 3 is a schematic depiction of cross-section (A) and surface morphology (B) of a tyrosinol (TYR)-functionalized membrane.

The membrane was free-fractured and imaged using FESEM (FIG. 3). Attenuated total internal reflectance-Fourier transform infrared (ATR-FTIR) spectroscopy was used to identify the chemical composition of the membranes (FIG. 4) using a FT/IR-6200 spectrophotometer (JASCO Corp, Tokyo, Japan).

Example 4: Impact of Solute/Nanopore Interactions on Permeation

Figure 5:
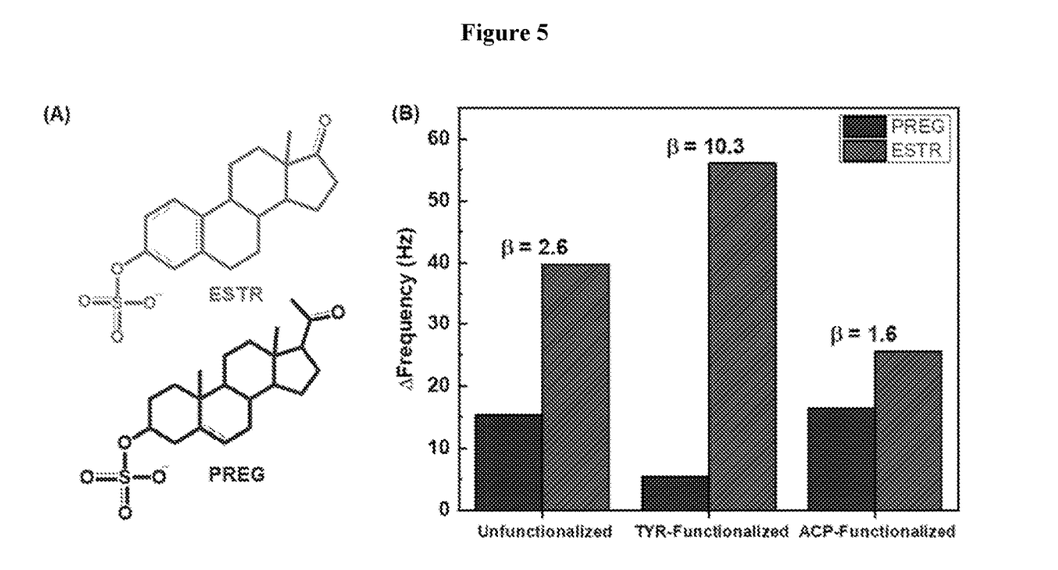
FIG. 5 is a schematic depiction of the chemical structures of both solutes (A) and frequency shift (at n=3) upon injection of hormones for membranes with unfunctionalized and functionalized films (B).

A study was performed to evaluate two steroids hormones as solutes with similar size and charge but different aromaticity, i.e., Estrone sulfate (ESTR) and Pregnenolone sulfate (PREG). Chemical structures of both solutes are shown in FIG. 5.

ESTR, containing an aromatic ring, is the most abundant estrogen precursor in the blood stream. By contrast, PREG, not containing any aromatic ring, is a relative of progesterone derived from cholesterol. ESTR and PREG are very similar in size (8.4 Å and 8.9 Å, respectively) and they have the same charge (i.e., −1) and similar functional groups. This means that variations in their diffusion rates would likely be due to solute-pore wall interactions. Aromatic groups lining the pores can interact with ESTR through π-π interactions. The strength and direction (attractive vs. repulsive) of π-π interactions correlate closely with the electron densities in the aromatic ring. Rings that have electron donating groups as substituents have a partial negative charge on the aromatic ring, and tend to interact more strongly with solutes containing electron withdrawing substituents.

Quartz crystal microbalance with dissipation (QCM-D) was used to confirm predictions regarding the selectivity of pore-solute interactions and to obtain quantitative evidence of adsorption/desorption equilibria. For this purpose, a quartz crystal resonator was coated with a thin film of the copolymer (about 70 nm) to mimic the surface chemistry of the pore walls. The surface was functionalized with TYR or ACP using the same procedure used for membranes. Frequency change, which is directly proportional to the mass of solute adsorbed on the surface, was recorded upon exposing the crystal to a solution of either PREG or ESTR.

FIG. 5(B) displays the frequency shifts for unfunctionalized, TYR-functionalized and ACP-functionalized films. For all membranes, a larger frequency shift was observed for ESTR in comparison to PREG solution, corresponding to higher adsorbed mass of ESTR. To evaluate the QCM results more quantitatively, a heuristic parameter, i.e., "adsorption selectivity", or β is defined as follows:

$$\beta = \frac{\Delta f_{ESTR}}{\Delta f_{PREG}}$$

where Δf is frequency shift as a result of interaction with solute whose name is noted in the subscript.

For the unfunctionalized membrane, an adsorption selectivity β of 2.6 was obtained. While no π-π interactions were present, the phenol groups in ESTR interacted more strongly with the —COOH groups on the surface through hydrogen bonding than PREG molecules.

When the surface was functionalized with TYR, a much larger frequency change was observed upon the injection of ESTR. This clearly illustrates ESTR has higher affinity to the TYR-functionalized surface through π-π interactions. In contrast, the adsorption of PREG decreased in comparison to the unfunctionalized surface, likely due to the change in net surface charge and the decreased availability of —COOH groups for hydrogen bonding. The TYR-functionalized surface was much more selective for ESTR, with a β value of 10.3.

The ACP-functionalized surface did not include any aromatic rings, but —OH groups similar to the TYR groups. Frequency shift due to ESTR adsorption was lower than that observed on the unfunctionalized and TYR-functionalized films. The ACP-functionalized surface has lower hydrogen bonding potential and no aromatic groups to enhance this interaction. The amount of PREG adsorbed on this surface was comparable to the unfunctionalized film. This resulted in a β value of 1.6, indicating that ACP-functionalized membranes have limited preference for ESTR.

For all the membranes, rinsing with DI water lead to immediate and complete desorption of bound solutes, indicated by an increase in frequency to its initial value. This shows that the interactions of solutes with functional groups on all the membranes were fully reversible.

Example 5: Membrane Permeance in Pressure-Driven Filtration

A study was performed to evaluate the membrane permeance in pressure-driven filtration. More specifically, pure water fluxes through the membranes described in EXAMPLES 2 and 3 were measured using an Amicon 8010 stirred, dead-end filtration cell (Millipore) with a cell volume of 10 mL and an effective filtration area of 4.1 cm². The cell was stirred at 500 rpm, and the test was performed at 40 psi.

During the study, the water permeance of unfunctionalized membranes was found to be 4.5±0.8 $Lm^{-2}h^{-1}bar^{-1}$. This water permeance was significantly lower than that of a support membrane, 820 $Lm^{-2}h^{-1}bar^{-1}$, confirming the presence of a coating layer. Upon TYR functionalization, a slight decrease was expected in the membrane permeance as the TYR molecule (6.7 Å) partially fills the nanopores (1-3 nm in size). Indeed, a decline on membrane permeance to 3.1±0.6 $Lm^{-2}h^{-1}bar^{-1}$ was observed.

Membrane permeance is strongly dependent on selective layer thickness, which can be further optimized by adjusting manufacturing parameters upon scale-up. Selective layer permeability is defined as membrane permeance normalized by the selective layer thickness. With the resistances-in-series model, permeability of the selective layer was determined to be 1.8±0.3 $L·\mu m·m^{-2}h^{-1}bar^{-1}$ and 1.3±0.2 $L·\mu m·m^{-2}h^{-1}bar^{-1}$ for unfunctionalized and functionalized membranes, respectively. These values were comparable to that of commercial thin-film composite nanofiltration membranes (0.2-1.4 $L·\mu m·m^{-2}h^{-1}bar^{-1}$), calculated assuming a selective layer thickness of 0.1 μm.

Example 6: Permeation of Aromatic and Non-Aromatic Organic Molecules

Figure 4:
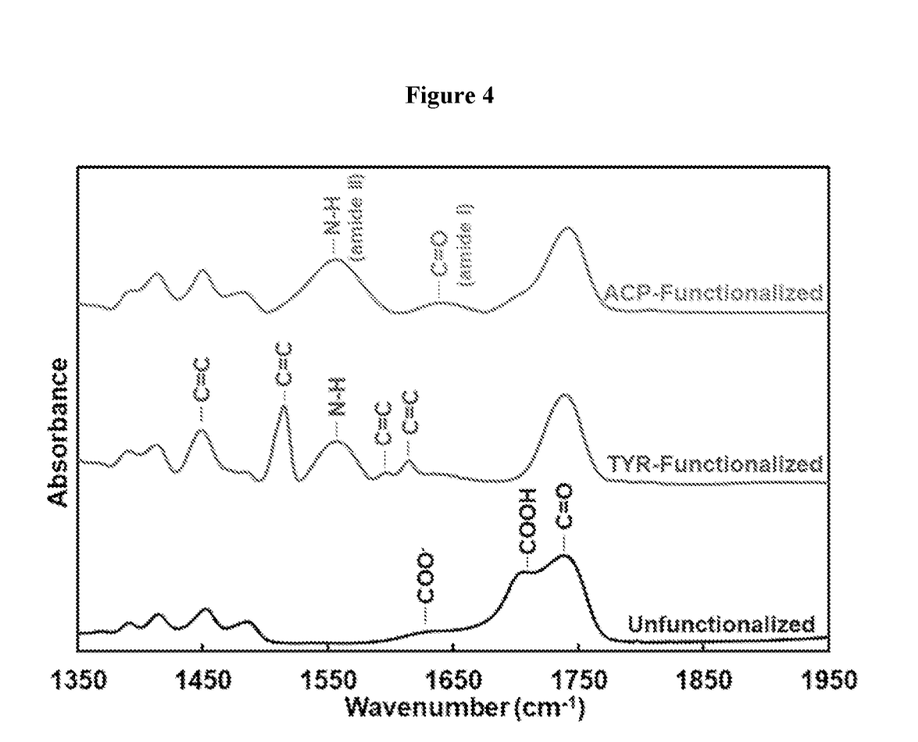
FIG. 4 is a schematic depiction of infrared spectra of unfunctionalized and functionalized membranes. Formation of new amide bonds upon functionalization confirms covalent attachment of amino compounds.

To determine how these differences in solute-pore interactions affect permeation, diffusion experiments were conducted in a two-compartment cell. The feed half-cell was filled with 100 ppm solution of desired solute, one at a time. Samples were taken periodically from permeate half-cell and solute concentration was assayed using high-pressure liquid chromatography coupled with mass spectroscopy (LC-MS). FIG. 4 shows nanomoles of the permeating solute through the membrane versus time (i.e. permeation rate) for both hormones, ESTR (pink) and PREG (blue), through the unfunctionalized, TYR-functionalized and ACP functionalized membranes. To quantify the ratio between diffusion rates of the two solutes, theoretical permeation selectivity $\alpha_T$ was defined as the ratio of the permeation rate of ESTR to that of PREG. Both solutes showed very similar diffusion rates through the support membrane ($\alpha_T=1$) as expected given its large pore size. This confirms that these two solutes had similar diffusivity and indicates that selectivity in the coated membranes resulted from selective layer.

The diffusion rate of PREG, the non-aromatic molecule, through the unfunctionalized membrane was about 1.9 times higher than that of aromatic ESTR ($\alpha_T=0.53$). See FIG. 6(A). ESTR interacted slightly more strongly with the —COOH groups on the unfunctionalized membrane than PREG, as indicated by the QCM-D data. These interactions appeared to slow down the passage of this molecule, as it hopped to the neighboring binding cites, while PREG molecules passed through the membrane unhindered.

Upon functionalization with TYR, the membrane exhibited its transport rate for PREG significantly enhanced despite the slightly smaller pore size relative to the unfunctionalized membrane. See FIG. 6(B). This is consistent with the lower degree of adsorption measured in QCM-D experiments. The overall negative charge of the membrane was also reduced upon the conversion of most of the acid groups to phenol, resulting in less repulsion between the pore wall and PREG molecules and thus easier passage through the membrane. The transport rate of ESTR increased only slightly in comparison to unfunctionalized membrane. Although the electrostatic repulsion was significantly reduced, favorable π-π interactions between the phenol groups in TYR and ESTR appeared to slow down the permeation of ESTR. These results are consistent with hopping transport mechanism, where adsorption/desorption equilibria dominate the time a solute takes to reach the permeate side. See Zilman et al., Plos Computational Biology, 2010, 6(6), e1000804. The least interactive solute transferred most quickly, whereas transient trapping of the preferred solute as it hopped through the binding sites inside the pores retards its permeation. As a result, PREG diffused 11.2 times faster than ESTR through this membrane ($\alpha_T=0.089$).

To confirm that π-π interactions and favorable binding of ESTR to phenol groups of the pores cause this change in transport rates, a similar study was conducted with the ACP-functionalized membrane. See FIG. 6(C). The diffusion rate of both PREG and ESTR were increased compared with the unfunctionalized membrane upon the decrease in membrane surface charge. ESTR diffused slightly more slowly than PREG ($\alpha_T$=0.63), in agreement with previous results and QCM-D data. This confirms that the significant changes in membrane selectivity observed in the TYR-functionalized membrane arise from π-π interactions, and not from simple changes in surface charge. Flux of both solutes and theoretical selectivity for all membranes are summarized in FIG. 6(D).

Example 7: Competitive Permeation in Two-Solute Mixtures

Figure 6:
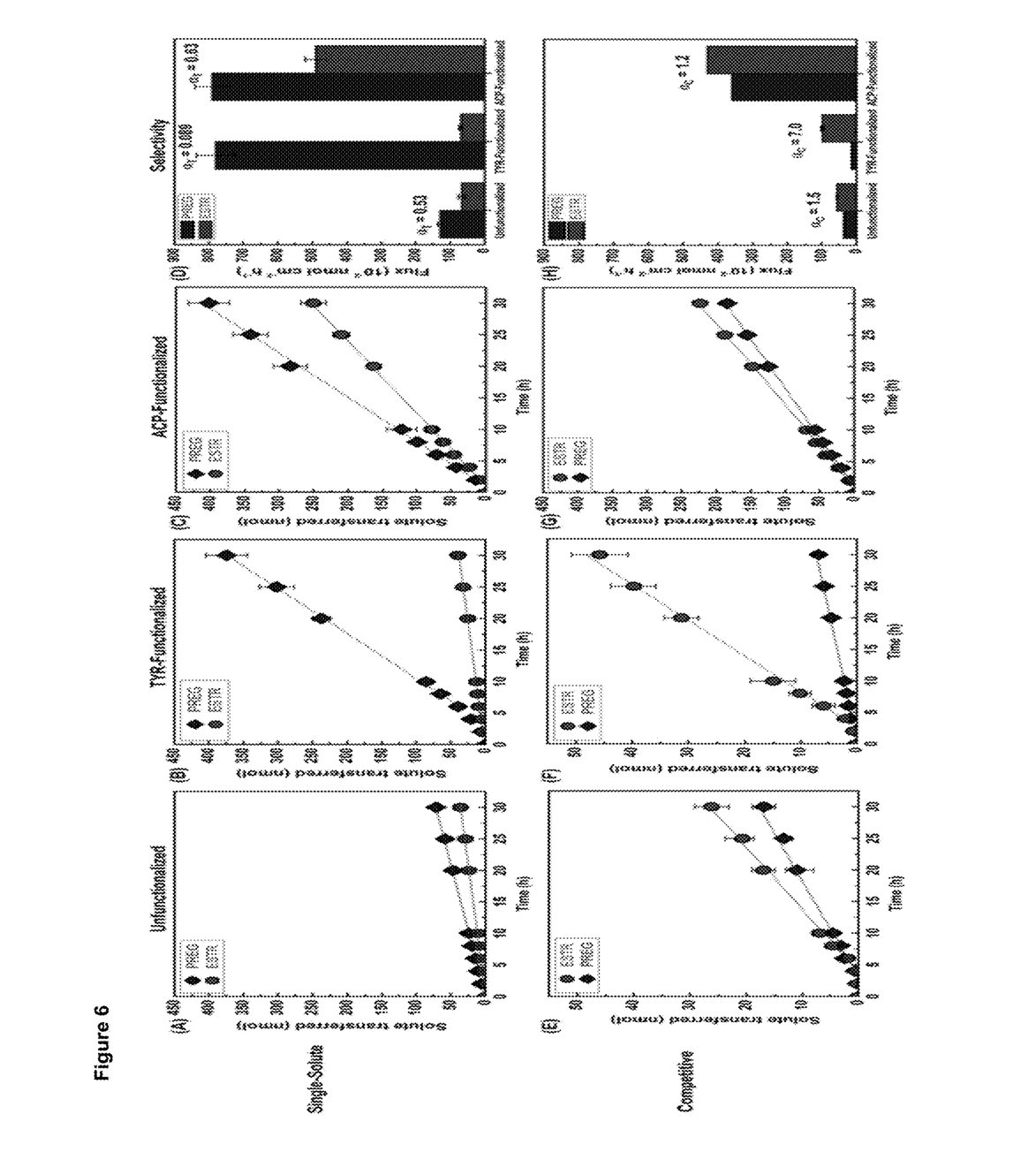
FIG. 6 is a schematic depiction of permeation of steroid hormones through unfunctionalized membrane (A and E), TYR-functionalized membrane (B and F), and ACP-functionalized membrane (C and G; "ACP" representing 2-amino-3-cyclohexyl-1-propanol).

A competitive diffusion study was conducted to evaluate the permeation properties of the membranes prepared in EXAMPLES 2 and 3. More specifically, the study was performed with feed solutions containing 100 ppm of each solute, ESTR and PREG. Competitive selectivity $\alpha_C$ was defined as the ratio of the fluxes of ESTR to PREG, analogous to $\alpha_T$ from single solute experiments. It was observed that the support membrane showed no selectivity between the two hormones ($\alpha_C$=1.1). FIGS. 6(E) to 6(G) depict the diffusion of the two solutes in these competitive diffusion experiments through the three membranes studied. All three membranes preferentially permeated ESTR, reversing the selectivity observed in single solute experiments.

For the unfunctionalized membrane, the diffusion rate of both solutes decreased in the competitive experiment in comparison to single solute experiments as expected since the two solutes are competing over the narrow space of the pores. See FIG. 6(E). This decrease was much more pronounced for PREG, making its permeation slightly slower than EST and leading to $\alpha_C$=1.5. This implies that the ESTR molecules, which interacted more with the pore walls in comparison to PREG, not only permeated through the membrane similar to before, but also inhibited the permeation of the PREG molecules. The ACP-functionalized membrane also showed a slow-down of PREG permeation rate and a reversal of selectivity, but to a lesser extent ($\alpha_C$=1.2). See FIG. 6(G). This is in agreement with the QCM-D data, which shows the ACP-functionalized membrane was less selective towards ESTR than the unfunctionalized membrane.

The most prominent change in selectivity was observed for the TYR-functionalized membrane, which interacted most selectively with ESTR through π-π interactions as indicated by QCM-D experiments. In competitive permeations with this membrane, the diffusion rate of PREG dropped dramatically in comparison to single-solute experiments. See FIG. 6(F). The permeation rate of ESTR was slightly enhanced.

These results indicate that the nanoporous membrane unexpectedly separated a mixture of two very similar molecules, based on a slight difference of their chemical structures.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

We claim:

1. A nanoporous membrane, comprising:
 a. a porous support layer having a first effective pore size of 2 nm to 10 μm; and
 b. a selective layer having a second effective pore size of less than 20 nm,
 wherein
 the selective layer, deposited on a surface of the porous support layer, contains an array of polymeric nanoparticles and nanopores therebetween;
 the second effective pore size is smaller than the first effective pore size; and
 the polymeric nanoparticles, formed of amphiphilic copolymers, each have on their surfaces a plurality of —C(=O)XR groups, wherein X is O, S, or NR', R' is H, alkyl, arylalkyl, heteroarylalkyl, aryl, or heteroaryl, and R is arylalkyl, heteroarylalkyl, aryl, or heteroaryl, wherein each of alkyl, arylalkyl, heteroarylalkyl, aryl, and heteroaryl is unsubstituted or mono-, di-, or tri-substituted with halo, hydroxyl, nitro, cyano, amino, $C_{1-6}$ alkyl, $C_{1-6}$ haloalkyl, $C_{1-6}$ alkoxyl, $C_{3-10}$ cycloalkyl, $C_{3-10}$ heterocycloalkyl, $C_{5-10}$ aryl, or $C_{5-10}$ heteroaryl;
 the amphiphilic copolymers each contain a hydrophilic repeat unit and a hydrophobic repeat unit, the two repeat units being in a roughly random order; and
 the hydrophilic repeat unit is formed from a first vinyl compound containing one or more carboxylic acid groups; and the hydrophobic repeat unit is formed from a second vinyl compound containing one or more fluorine atoms.

2. The nanoporous membrane of claim 1, wherein the polymeric nanoparticles each contain a hydrophilic repeat unit, a hydrophobic repeat unit, and a conjugated repeat unit having a —C(=O)XR group, the three repeat units being in a roughly random order.

3. The nanoporous membrane of claim 1, wherein the first vinyl compound is selected from the group consisting of acrylic acid, methacrylic acid, a methacrylate, an acrylate, an acrylamide, and styrene; and the second vinyl compound is selected from the group consisting of a methacrylate, an acrylate, an acrylamide, and fluorine-substituted styrene.

4. The nanoporous membrane of claim 3, wherein the hydrophilic repeat unit is formed from methacrylic acid (MAA) and the hydrophobic repeat unit is formed from trifluoroethyl methacrylate (TFEMA).

5. The nanoporous membrane of claim 2, wherein the hydrophilic repeat unit is formed from a first vinyl compound containing one or more carboxylic acid groups and the hydrophobic repeat unit is formed from a second vinyl compound containing one or more fluorine atoms.

6. The nanoporous membrane of claim 5, wherein the hydrophilic repeat unit is formed from MAA and the hydrophobic repeat unit is formed from TFEMA.

7. The nanoporous membrane of claim 1, wherein the polymeric nanoparticles each have on their surfaces a plurality of —C(=O)XR groups, wherein X is O or NR'.

8. The nanoporous membrane of claim 7, wherein the polymeric nanoparticles each have on their surfaces a plurality of —C(=O)XR groups, wherein X is O and R is arylalkyl or aryl.

9. The nanoporous membrane of claim 7, wherein the polymeric nanoparticles each have on their surfaces a plurality of —C(=O)XR groups, wherein X is NR', R' is H, and R is arylalkyl or aryl.

10. The nanoporous membrane of claim 1, wherein the first effective pore size is 5-nm and the second effective pore size is less than 5 nm.

11. The nanoporous membrane of claim 1, wherein the selective layer has a thickness of 50 nm to 2 μm.

12. The nanoporous membrane of claim 1, wherein the amphiphilic copolymers each contain a hydrophilic repeat unit and a hydrophobic repeat unit, the two repeat units being in a roughly random order; and the polymeric nanoparticles each have on their surfaces a plurality of —C(=O)XR groups, wherein X is O or NR'.

13. The nanoporous membrane of claim 12, wherein the hydrophilic repeat unit is formed from MAA and the hydrophobic repeat unit is formed from TFEMA; and the polymeric nanoparticles each have on their surfaces a plurality of —C(=O)XR groups, wherein X is NR', R' is H, and R is arylalkyl or aryl.

14. A method of fabricating a nanoporous membrane of claim 1, comprising:
   a. providing a solution of polymeric micelles by dissolving amphiphilic copolymers in an organic solvent;
   b. obtaining a two-layer film by coating onto a porous support layer the solution of polymeric micelles to form a selective layer that contains an array of polymeric nanoparticles and nanopores therebetween, wherein the polymeric nanoparticles each having on their surfaces a plurality of —C(=O)OH groups; and
   c. transforming the plurality of —C(=O)OH groups in part or in whole to a plurality of —C(=O)XR groups.

15. The method of claim 14, wherein each of the amphiphilic copolymers is P(TFEMA-r-MAA).

16. A method of separating a solute from a mixture comprising two solutes, comprising:
   a. providing a nanoporous membrane of claim 1;
   b. directing the mixture through the nanoporous membrane that allows one of the two solutes permeates through; and
   c. collecting the solute that permeates through the nanoporous membrane.

17. The method of claim 16, wherein the two solutes are two organic molecules of similar size or electrical charge.

18. The method of claim 17, wherein one of the two organic molecules comprises an aromatic group and the other does not.

* * * * *